United States Patent Office 3,518,422
Patented June 30, 1970

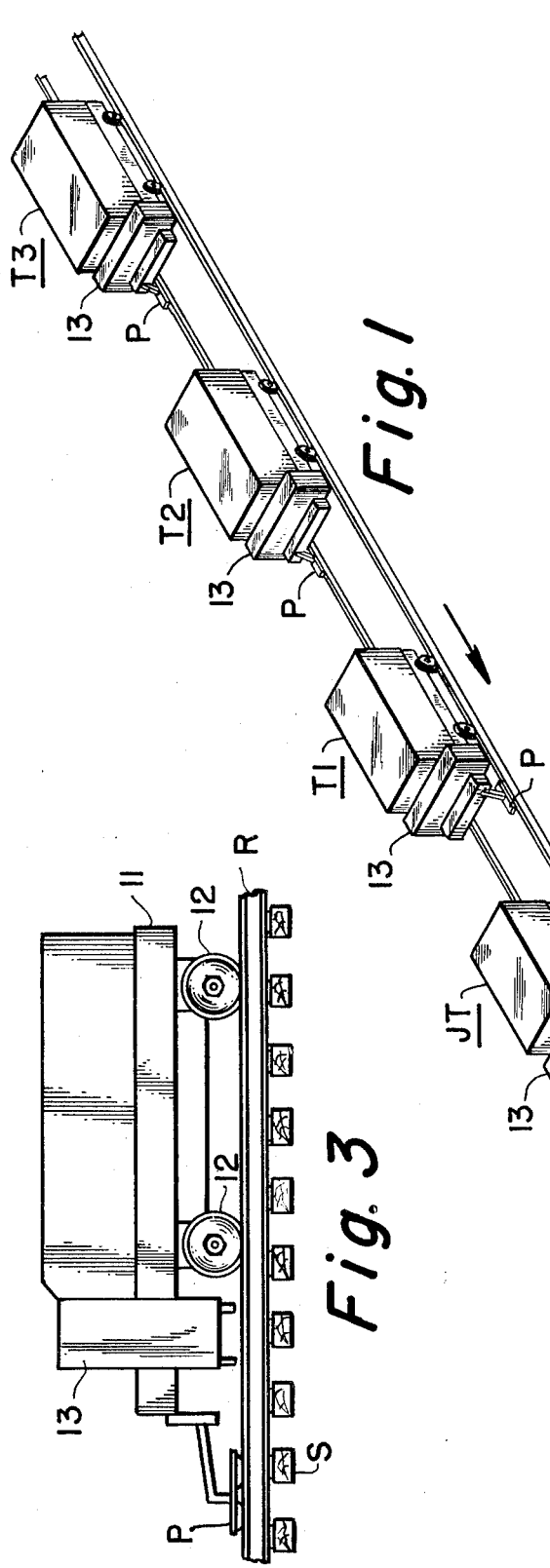
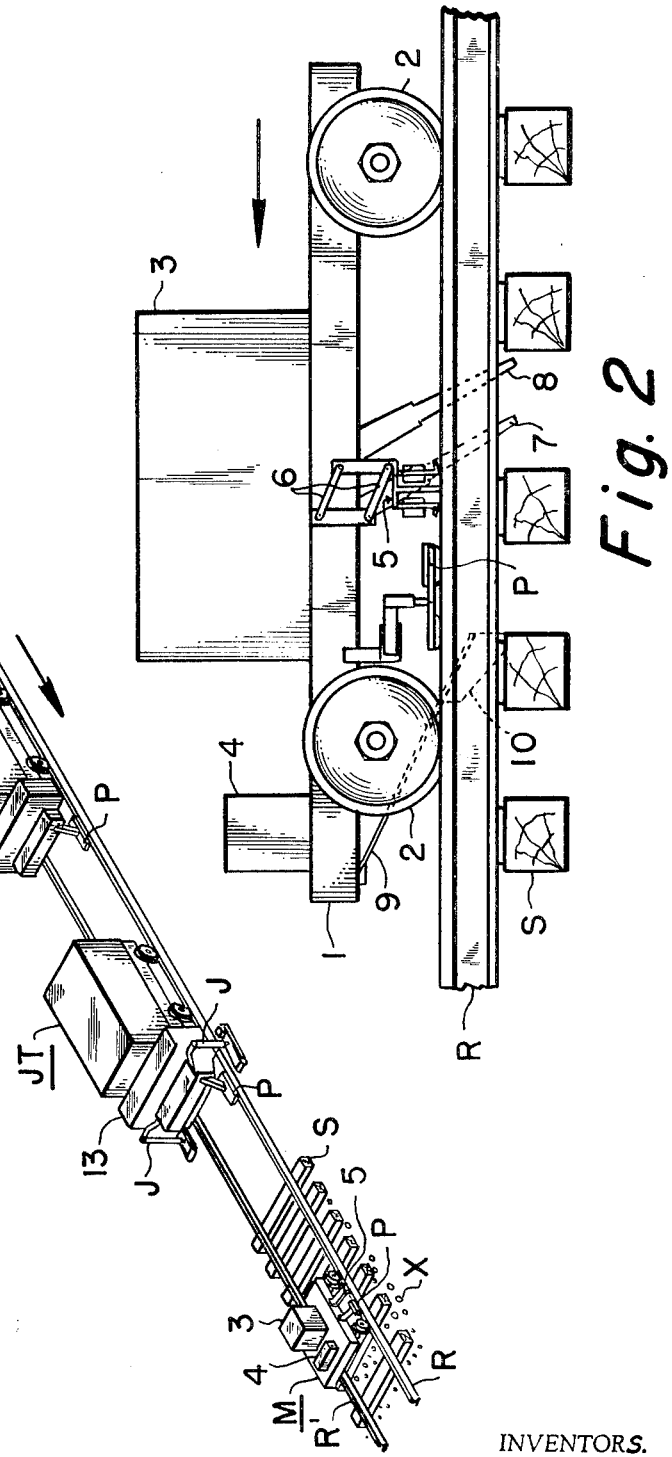

3,518,422
VEHICLE CONTROL APPARATUS
Richard B. Doorley, Brentwood Borough, and Paul S. Settle, Jr., Fox Chapel Borough, Pa., assignors to Railway Maintenance Corporation, Pittsburgh, Pa., a corporation of Pennsylvania
Original application May 16, 1966, Ser. No. 550,347, now Patent No. 3,362,348, dated Jan. 9, 1968. Divided and this application Nov. 9, 1967, Ser. No. 723,956
Int. Cl. B61l 3/06; B61k 9/08
U.S. Cl. 246—167                                   13 Claims

ABSTRACT OF THE DISCLOSURE

Apparatus for controlling vehicles traveling along railroad track comprising a first vehicle carrying an encoder for placing a coded mark on at least one rail of the track and at least one vehicle traveling along the track behind the first vehicle and carrying a pick-up head for sensing marks placed by the encoder. The pick-up head being operatively connected with means for controlling the vehicle upon which it is carried.

---

This application is a division of application Ser. No. 550,347, filed May 16, 1966, now U.S. Pat. No. 3,362,348.

This invention relates generally to the control of vehicles traveling along a railroad track and more particularly to the accurate spotting of vehicles at specific locations such as work stations which are designated as track conditions require. The operations which must be performed along a section of track are established by the condition of the track under consideration, and this in turn dictates the information necessary to control the vehicle or vehicles which are required to carry out the operations on the track. Information in the form of magnetic marks is placed directly in the rails of the track in the vicinity of each location or work station where an operation or a plurality of operations are to be performed. Each mark is coded and positioned on the rails in a specific manner, and each vehicle is provided with a pick-up head for sensing the coded marks and with a detector circuit for discriminating between various marks so that vehicles designed to perform specific operations are stopped at the proper work stations and the working cycle initiated. Although the invention has specific and important applications in the maintenance of railroad track it is not limited to this use.

The most generally accepted method for positioning track maintenance equipment at work stations in present day maintenance operations is to stop the vehicle at the individual work stations in accordance with visual inspection of the track by either the vehicle operator or an inspector moving along the track ahead of the vehicle. When the vehicle is properly positioned, the working tool or tools are actuated by the operator and the working cycle is carried out. At the completion of the cycle, the operator moves the vehicle along the track until either he or the inspector spots it at the next station where the work cycle is to be performed. Control of maintenance equipment in this manner requires an operator of considerable skill and experience since it is essential that the vehicle be stopped with the working tools accurately positioned in order that the operation be carried out in a manner providing consistent results of high quality. For example, in a tie tamping operation if the tamping tools of a tamper are not equidistant from opposite sides of the tie, the ballast compaction beneath the tie will be uneven. In order for an operator to accurately spot a vehicle at a work station while moving the vehicle from station to station at a reasonable rate of speed, it is common practice for the operator to jog the vehicle back and forth by manual movement of the controls until the tools are properly positioned. This mode of spotting the vehicle obviously requires a plurality of rapid coordinated movements of the controls by the vehicle operator and is very tiresome. Furthermore, this mode of spotting is only practical during daylight hours and in areas where commuter traffic is heavy; it is desirable to perform maintenance operations at night to minimize interruption of traffic.

Our invention provides automatically controlled vehicles which can be moved from one work station to another and accurately spotted with the working tools located within the tolerances necessary to properly perform their function. The automatic control of the equipment makes it possible to eliminate the operator and track inspector with the consequent elimination of inconsistency and poor quality caused by inherent operator fatigue. Since an operator is not required when using our invention, it is possible to utilize a plurality of vehicles in tandem at a constant relatively high rate of speed and, when conditions require, operations may be performed with accuracy after dark.

In its most basic form, our invention consists in apparatus for controlling the movement and performance of a vehicle or a plurality of vehicles traveling along a railroad track and for placing coded magnetic marks indicating the location and type of various operations to be performed at different locations along the track. The vehicles may be mounted either on flanged wheels for travel directly on the track rails or on rubber wheels for travel over the ground adjacent to the rails. The coded magnetic marks are impressed directly in at least one of the rails at specific locations along the track and are subsequently detected by pick-up heads mounted on vehicles and positioned over the rail or rails carrying the marks. The marks are located in a specific position on the rails, and each mark has a specific pattern of magnetic polarity and specifically spaced magnetic zones. Each pick-up head is positioned relative to a rail in a manner to detect certain marks and is connected in a detector circuit arranged to discriminate between signals created by the differently coded marks. A plurality of vehicles may be controlled by utilizing different marks having various locations on the rails or by programming the various detector circuits to stop the vehicles only at marks having a specific relationship to other marks. Additionally, the pick-up heads and detector circuits are constructed in a manner which prohibits response to residual magnetism or noise in the rail; and, therefore, a vehicle is stopped only at a location indicated by a particular mark placed in the rail. The detector circuit on each vehicle is connected with controls on the vehicle to automatically stop the vehicle at the work station with the working tools properly positioned and to actuate the working tools when the vehicle is stopped. After the work cycle is completed, the tools are deactuated and the vehicle proceeds along the track to the next work station designated by a mark having a location and code which causes a signal to be supplied to the detector circuit to which the circuit responds to again stop the vehicle.

In the accompanying drawings, we have illustrated embodiments of our invention in which:

FIG. 1 is a diagrammatic illustration of a plurality of vehicles arranged in series along the track in accordance with one embodiment of our invention;

FIG. 2 is a schematic side elevation of the tie finding and encoder vehicle shown in FIG. 1;

FIG. 3 is a schematic side elevation of an automatic tamper equipped with a pick-up head which may be controlled according to our invention;

Figure 4:
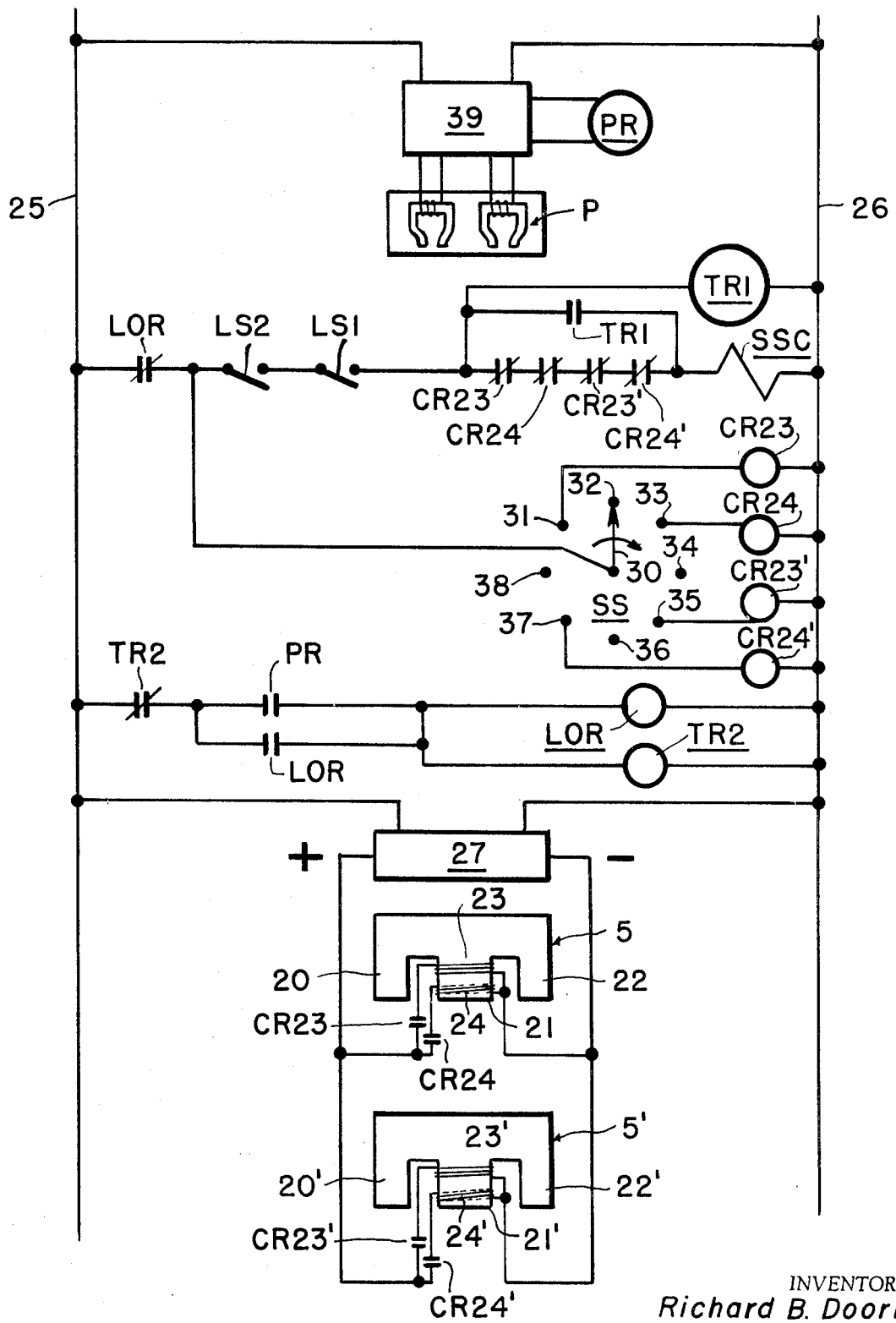
FIG. 4 is a circuit for operating a pair of encoders which may be used on the vehicle shown in FIG. 2.

Referring to FIG. 1 of the drawings, a section of track having rails R and R' is supported on ties S which are in turn supported on ballast B, and the direction of movement along the track is from right to left as shown by the arrow. The first vehicle in the group is the tie finder and encoder vehicle M, and this vehicle may be followed by a gang of automatic tampers comprising a jack tamper T having forwardly located jacks J and three standard tampers T1, T2 and T3.

As shown in FIG. 2, the vehicle M includes a frame 1, flanged rail wheels 2, a power source 3, control housing 4 and an encoder or marking head 5 located over the rail R. The encoder is mounted on the vehicle frame by pivoted arms 6 so that it can be elevated when the vehicle is traveling to and from the working area. Encoder 5 consists of a three-tine soft iron core having a pair of oppositely wound coils on the central tine so that it is a reversible electromagnet. A mark having three distinct magnetic zones is impressed in the rail by the encoder when current is passed through one of the coils, and the polarity of the zones is reversed by using different coils as explained in detail in connection with FIG. 4. A pick-up head P is also mounted on frame 1 immediately ahead of the encoder 5 for a purpose to be described hereinafter. Although only one encoder is shown in FIG. 2, it should be understood that a second encoder having the same construction as encoder 5 may be mounted on the opposite side of vehicle M over the rail R'.

Vehicle M also carries a pair of spring loaded contact members 7 and 8 depending from the longitudinal center line of the vehicle adjacent encoder 5. The contact members are aligned with one another and are normally urged downwardly by springs (not shown). When members 7 and 8 contact a tie, they will ride up on the surface thereof against the force of the springs and maintain contact therewith until the vehicle moves forward along the track. The contact members are longitudinally spaced so that both members can simultaneously contact a tie; and when both members are forced upwardly against the force of the springs, a limit switch located at the upper end of each member is closed. When the switches are simultaneously closed, the circuit shown in FIG. 4 is actuated and a coded mark is placed in a rail to indicate the location of a tie. The marks are placed in the rail in a predetermined fixed relationship with the ties according to the design of the vehicle which is to be controlled by the marks. It is not necessary that the encoder contact the railhead in order to impress a mark in the rail; however, we have found it more convenient to have the encoder contact the rail since this arrangement does not require a feeler for vertically locating the encoder in respect of the upper surface of the railhead. Although spring loaded contact members 7 and 8 have been shown and described for finding ties, it should be understood that other arrangements such as light rays, heat waves or sound waves may also be used for locating ties and activating the encoder to mark a rail.

In carrying out our invention on track mounted on ballast supported ties, it is essential that there be no loose ballast in the horizontal plane of the upper surfaces of the ties since this ballast could interfere with the operation of contact members 7 and 8. For this reason, the machine M is provided with a vibrating arm 9 having a sweeper member 10 attached at its lower end to remove loose ballast which could interfere with the contact members. The vibrating arm and sweeper member are located on the center line of the machine in alignment with the contact members, and the sweeper member clears any loose ballast from the path of the contact members. The arm may be vibrated by an independent motor or may be driven by the vehicle power source 3. As an alternative to mounting a vibrating sweeper member machine M, an independent ballast brush machine may be utilized ahead of the machine M to remove loose ballast from the ties. The use of an independent ballast brush machine is more expensive than providing machine M with a vibrating sweeper, but exceptionally poor ballast conditions may require the use of a separate machine. The ballast brush machine is of well-known design and construction, and the specific features thereof form no part of our invention. It should be understood that our invention may be used with equal facility on track mounted on ties which are not supported on ballast; and when used in this setting, it is, of course, not necessary to use either the ballast sweeping device on machine M or an independent ballast brush machine.

Figure 5:
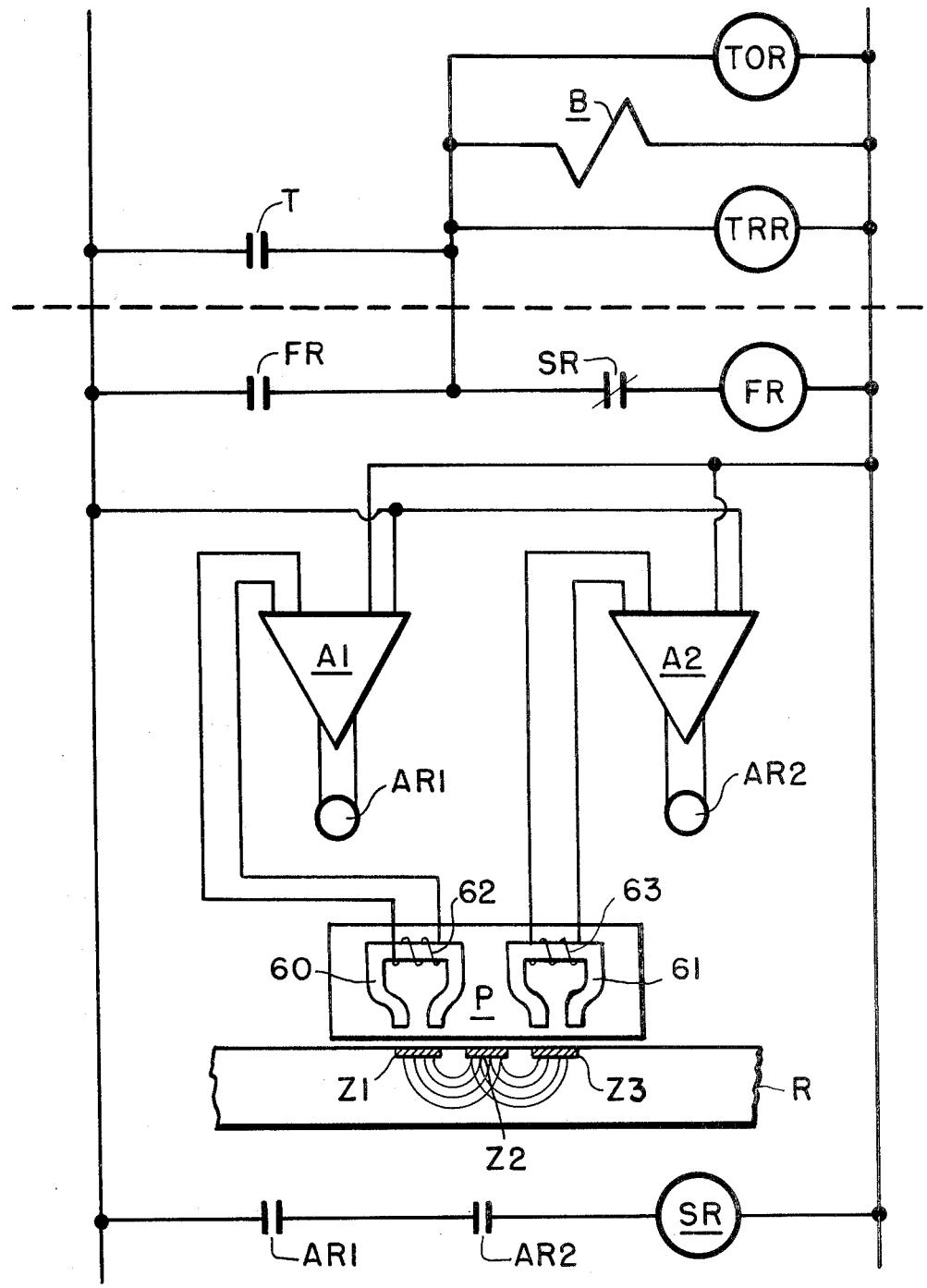
FIG. 5 is a detector circuit which may be used for actuating the vehicle and tool controls in accordance with one embodiment of our invention.
Figure 9:
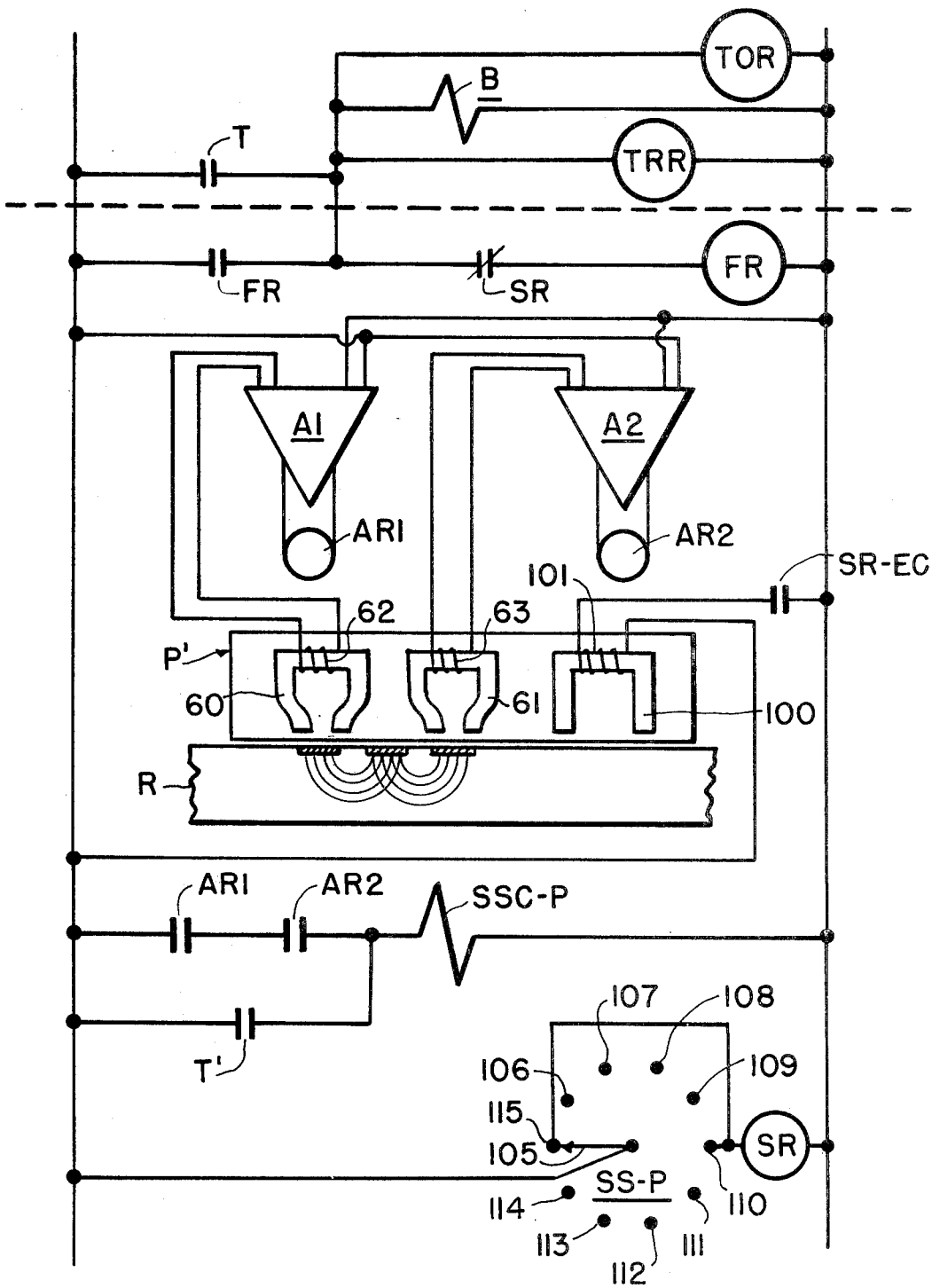
FIG. 9 is a modified detector circuit which may be used for actuating the vehicle and tool controls in accordance with another embodiment of our invention.

Automatic tampers which may be controlled in accordance with our invention are commercially available multiple tool tampers, and either jack tampers, standard tampers or a combination thereof may be used. The tamper shown schematically in FIG. 3 is a standard tamper having a frame 11, flanged rail wheel 12 and a forwardly located tamping head 13 which includes the tamping tools. The tamper is provided with a pick-up head P located over a rail for sensing marks impressed in that rail. The pick-up head is positioned in respect of the tamping tools so that the tools are properly aligned with the tie to be tamped when the tamper is stopped in response to the output of the pick-up head supplied to the detector circuit when the proper mark is sensed. Although only one pick-up head is shown on the tamper in FIG. 3, it should be understood that our invention also includes tampers or other pieces of equipment having a pick-up head mounted over each rail so that a mark on either rail can be sensed. Detector circuits which may be used for carrying out our invention are shown in FIGS. 5 and 9 and are described in detail hereinafter.

In the following non-limiting example, two differently coded marks are located in each rail for control of the four-tamper gang shown in FIG. 1. The pick-up heads on tampers T and T1 are located over rail R, and the pick-up heads on tampers T2 and T3 are located over rail R'. The detector circuit for one pick-up head of each pair of tampers (T and T1 or T2 and T3) responds only to a signal generated by a mark having a north-south-north code, and the detector circuit for the other head of that pair of tampers responds only to a signal generated by a mark having a south-north-south code. When a pick-up head locates a mark having the proper code, a signal is generated, the signal is amplified, and the amplified signal actuates the vehicle brake and disengages the vehicle travel motor. The tamping tools are also actuated and the tamping cycle is initiated. The tie is then tamped in a predetermined manner; and when the tamping cycle is completed, the brake is automatically released and the travel motor actuated and the tamper travels along the track until the pick-up head locates another mark having a code which creates a response in the detector circuit. The operation of this detector circuit is described in detail in FIG. 5. It should be understood that each detector circuit is responsive only to a signal generated by the pick-up head when the head senses a specific code; and that the intensity of the flux at the mark is of no importance provided it is of sufficient strength to permit identification. Although this embodiment has been described in connection with a four-tamper gang, the number and type of machines controlled is not critical.

Referring to FIG. 4 of the drawings, the encoder 5 over rail R consists of a three-tine soft iron core having tines 20, 21 and 22. A pair of coils 23 and 24 are wound in opposite directions on tine 21 of the core, and each coil is connected with a control relay which permits current to pass through the coil when the relay is energized to close a contact. The control relays and contacts for the coils on encoder 5 are designated CR23 and CR24 and are connected in the marking circuits as shown. Depending upon the coil which is momentarily actuated, a north-south-north mark or a south-north-south mark is impressed in the rail. The encoder located over rail R' in this embodiment is a duplicate of encoder 5, and in FIG. 4 the same reference numerals are used therewith with a prime. The leads 25 and 26 provide AC current; and since the coils of the encoders 5 and 5' operate on DC current, it is necessary to connect rectifier 27 between the leads and the coils.

The marking circuit shown in FIG. 4 includes limit switches LS1 and LS2 located in series which permit energization of one of the control relays when they are simultaneously closed. Limit switch LS1 is controlled by forward contact member 7, and limit switch LS2 is controlled by rear contact member 8. The limit switches are closed when the contact members are raised by contact with the upper surface of a tie. A stepping switch SS having a contact arm 30 mounted for rotation as indicated by the arrow and eight peripheral contacts 31, 32, 33, 34, 35, 36, 37 and 38 is connected between relays CR23, CR24, CR23' and CR24' and switches LS1 and LS2. The stepping switch determines the relay which is energized upon closure of the limit switches. Stepping switch contacts 31, 33, 35 and 37 are live while contacts 32, 34, 36 and 38 are dead. The stepping switch which has been utilized is a type MER manufactured by Guardian Electric Manufacturing Company, but other commercially available stepping switches may also be used. Upon energization of one of the control relays, its contact is momentarily closed and a current pulse passes to its encoder coil and a mark is impressed in the rail over which the encoder is located. The stepping switch includes a stepping coil SSC which is connected in series with relay contacts CR23, CR24, CR23' and CR24'. A timing relay TR1 is connected in parallel with coil SSC, and contact TR1 of the timing relay is connected in parallel with contacts CR23, CR24, CR23' and CR24' to permit current to pass to coil SSC when one of the control relay contacts is open.

The pick-up head P and detector circuit shown in the marking circuit of FIG. 4 are the same as shown in FIG. 5 except that the circuit of FIG. 4 is connected with the marking circuit rather than with the control circuit for the equipment so that the detector circuit controls operation of the encoders. The detector circuit is indicated by the box 39 which is connected to pick-up relay PR, and this relay is energized when pick-up head P senses a mark and a signal is transmitted to the circuit 39. The relay contact PR is connected between lock out relay LOR and a normally closed contact TR2 of timing relay TR2. The lock out relay has a normally open contact LOR connected in parallel with relay contact PR and a normally closed contact LOR in series with limit switches LS1 and LS2. As explained hereinafter, when contact LOR opens, the marking circuit is deactuated even though switches LS1 and LS2 are simultaneously closed.

The marking circuit operates as follows assuming that limit switches LS1 and LS2 are open and that arm 30 is on a dead contact, for example 32. The arms 7 and 8 are raised by contact with a tie, and the limit switches are thereby closed completing the circuit through coil SSC to advance contact arm 30 to live contact 33 and energize control relay CR24 to close open contact CR24 and permit a pulse of current to pass to coil 24 and a mark is impressed in the rail. The code of the mark is determined by the winding of coil 24 which is energized upon closure of contact CR24 by relay CR24. When arm 30 contacts live contact 33, contact CR24 of the control relay opens to disconnect coil SSC and reset the stepping mechanism for actuation by the next pulse of current. Only a short duration pulse is required to mark the rail, and timing relay TR1 times out in a fraction of a second and closes contact TR1 to reconnect stepper coil SSC in the circuit and rotate arm 30 to dead contact 34 which de-energizes relay CR24 and opens contact CR24 to interrupt current flow to coil 24. Timing relay TR1 is reset, and its contact opens when limit switch LS1 opens as a result of forward contact member 7 dropping off the tie as the vehicle moves forward.

If a work station has been previously marked for one reason or another, it should not be marked again, and for this reason, the marking circuit includes pick-up head P. Only one pick-up head is required in the marking circuit since any marks placed along the track prior to the passage of vehicle M will be placed in the same rail. Assuming that a mark has been placed in a rail, it will be sensed by pick-up head P and the output of the pick-up head transmitted to detector circuit 39 to energize pick-up relay PR and close contact PR to permit current to pass to lock out relay LOR. When relay LOR is energized, contact LOR is closed, and contact LOR is opened. Opening of contact LOR disconnects switches LS1 and LS2 from lead 25 and thereby prevents current from passing to coil SSC to index arm 30 to a live contact even when contact members 7 and 8 are simultaneously raised by contact with the surface of a tie to close switches LS1 and LS2. The pulse transmitted to relay LOR is of a short duration since relay PR is energized only while pick-up head P is over a mark; and in order to insure that relay contact LOR remains open until contact arm 7 falls off the tie to open switch LS1, the timing relay TR2 is energized at the same time as relay LOR. Relay TR2 is set to maintain relay LOR energized a sufficient length of time for contact member 7 to drop off the tie and permit switch LS1 to open after which relay TR2 times out and opens contact TR2 which de-energizes relay LOR to close contact LOR between line 25 and switch LS2 and relay TR2 is reset. Contact LOR in parallel with contact PR is opened by de-energization of relay LOR, and the lock out circuit is reset to respond to another signal from the pick-up head.

In FIG. 5, a pick-up head P is shown connected in a detector circuit which is connected with the control circuit for the vehicle travel motor and brake and for the working tools. The pick-up head consists of a pair of cores 60 and 61 of soft iron each of which has a coil 62 and 63 wound on its base. The coils are connected to amplifiers A1 and A2, and the amplifiers are connected to relays AR1 and AR2 having contacts for controlling a stop relay SR which energizes forward relay FR in the vehicle control circuit to control the travel motor, brakes and tools. The vehicle control circuit shown above the dotted line in FIG. 5 includes a relay TOR for controlling the working tools, a solenoid B for controlling the vehicle brakes and a relay TRR for controlling the travel motor. A contact T is connected between the power supply and relay FR to energize the relay when closed. The specific vehicle control circuit forms no part of our invention, and any control circuit including means for controlling the travel motor, brakes and tools may be used.

Assuming rail R to be marked as shown in FIG. 5 with a north zone $Z_1$, a south zone $Z_2$ and a second north zone $Z_3$, a magnetic flux is present at the mark as shown, and the sequence of operations of a vehicle equipped with the detector circuit will take place in the following manner. At the conclusion of a work cycle, relay contact T is momentarily closed and a pulse is simultaneously sent to the forward relay FR in the vehicle control circuit to energize the relay and close contact FR to disengage the brakes and actuate the travel motor causing the vehicle to move forward along the track. After contact T is closed to initiate vehicle movement, it immediately opens in preparation for the next cycle; but contact FR of relay FR remains closed and prevents the relay from dropping out. When the magnetic cores of the pick-up head attain the position shown in FIG. 5, they are each sensing a north zone ($Z_1$ and $Z_3$) and signals of a short duration will be transmitted to amplifiers A1 and A2. Upon receiving signals from the north zones, amplifier relays AR1 and AR2 are simultaneously energized to close contacts AR1 and AR2 to energize stop relay SR and open contact SR. Stop relay SR receives a pulse only while the pick-up head is over the mark and, therefore, contact SR is opened only momentarily to de-energize forward relay FR causing it to drop out and open contact FR which actuates the vehicle brakes and deactuates the travel motor to stop the vehicle. Upon deactuation of the travel motor, the work cycle is initiated and will be completed before the tools are deactuated to once again momentarily close contact T to energize relay FR and close contact FR and initiate movement along the track. Since relay SR receives a momentarily pulse only, contact SR is opened only long enough to de-enerfiize relay FR and is then closed in preparation for the next pulse.

Figure 6:
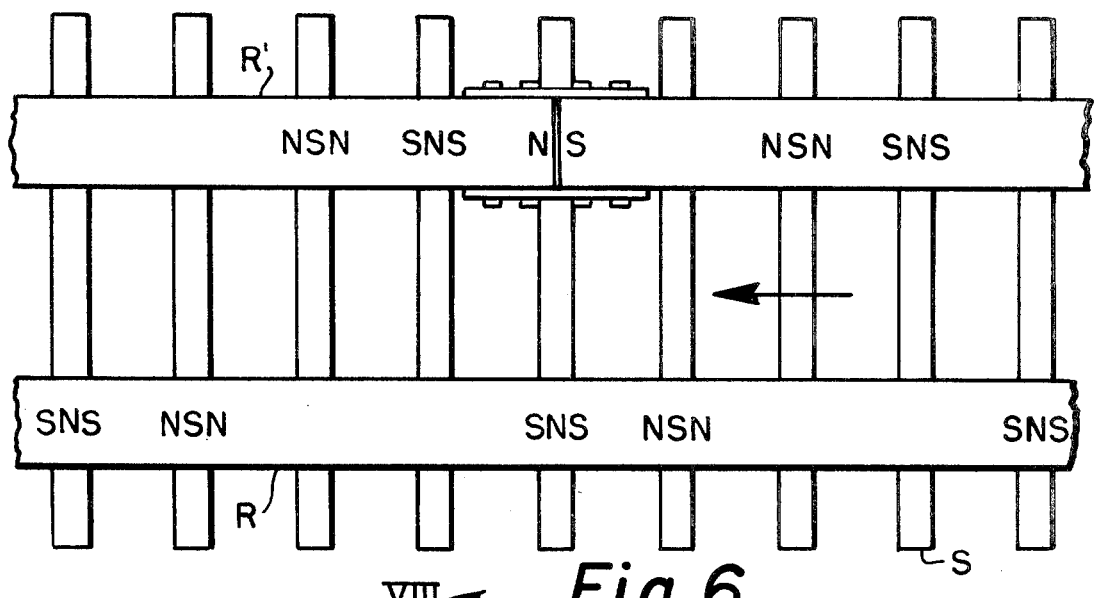
FIG. 6 is a diagrammatic plan view of a section of track marked in accordance with one embodiment of our invention.

The following explanation of one embodiment of our invention in connection with FIG. 6 assumes the rails to be marked as shown and further assumes that the vehicle of a four vehicle gang proceed from right to left in the direction of the arrow. The first vehicle in the gang has a pick-up head located above rail R', and the detector circuit of this vehicle is responsive only to the signal generated when the pick-up head senses a south-north-south mark. The second vehicle also has a pick-up head located over the rail R', but the detector circuit will only respond to the signal generated by a north-south-north mark. The pick-up heads on the third and fourth vehicles in the gang are located above rail R. The detector circuit for the first of these two vehicles responds only to the signal generated by a north-south-north mark as shown in FIG. 6, whereas the detector circuit for the second vehicle of this pair is responsive only to the signal generated by the pick-up head when it senses a south-north-south mark.

Marks having three specifically spaced zones of alternate polarity are necessary in carrying out our invention rather than marks having only two zones to insure that it is possible to distinguish between the marks impressed in the rails and residual magnetism and other noise inherent in most rails. For example, adjacent rail ends will have opposite polarity as shown in rail R' in FIG. 6, and, therefore, the magnetic flux at abutting rail ends will be equivalent to that which would be present at a mark having north and south zones. Additionally, a rail which has been handled by a magnetic crane may be locally magnetized, and magnetic flux may be created in rails by current passed through the rails in normal signaling operations. Our system will not respond to noise in the rails such as created at the rail joint in rail R' or to any other noise in the rails.

The first tie in the section to be tamped may be selected by a maintenance foreman and marked by him with a permanent magnet, or it may be marked by the machine M after which machine M proceeds along the track and marks subsequent ties automatically. In some instances it is desirable to tamp the first tie of the section under consideration prior to the passage of the machine M in order to provide a bench mark for subsequent operations. Additionally, in some instances it is desirable to proceed along the track with an independent jack tamper and raise and tamp various ties according to track condition. When, for one reason or another, ties are tamped prior to passage of the machine M over the track, a coded mark is placed on one of the rails to indicate the tamped tie or ties; and the pick-up head P and the machine M described in connection with FIG. 4 is located over the marked rail to sense these marks and prevent impression of another mark in the rail to indicate a tamped tie. The marks used to indicate tamped ties is different from the marks placed on the rails by the machine M, and, therefore, the tamper pick-up heads will not generate a signal at these marks.

Although this embodiment has been described specifically in connection with controlling four tampers in tandem behind the encoding machine M, it is possible to utilize any number of machines in a gang without departing from the spirit and scope of our invention. Additionally, our invention includes the control of machines other than tampers and, in fact, it is possible to control a number of different kinds of machines in accordance with our invention. The number and type of machines to be controlled determines the location on the railhead and the number of different marks which must be used in our system since it is necessary to provide a distinguishable mark for each machine; and if more than four machines are used, it will be necessary to either use marks with more than three zones, to vary the spacing of the zones or to vary the location of the marks in order to provide distinguishable marks for controlling the machines. For example, a plurality of identical marks may be placed adjacent one another on one rail at the same longitudinal position along the rail to control a plurality of machines or both rails may be marked at the same point. The use of a plurality of marks at the same point has particular application when a number of different machines must perform their functions in sequence at the same work station.

Another embodiment of our invention comprises using an identical coded mark to indicate each work station. In accordance with this embodiment, only one rail is marked; and each detector circuit includes a counting means such as, for example, a stepping switch which activates the vehicle control circuit only after a predetermined number of marks have been sensed by the pick-up head. After the detector circuit receives the number of signals from the pick-up head to which the vehicle is programmed to respond, the vehicle is stopped and the work cycle carried out. An alternating current magnet located immediately behind the pick-up head may be used to erase the mark from the rail so that it will not be sensed by pick-up heads on subsequent vehicles. Since the embodiment requires only one type of mark and since all marks are located on the same rail, it is less complex than the previously described embodiment and it is practical to use a manual encoder, if desired, since the polarity of the alternate zones in the mark need not be reversed. Even when an electromagnetic encoder is used in this embodiment, the control circuit is less complex than that described heretofore in connection with FIG. 4 since only one rail is marked and only a single code is required. When performing our invention in accordance with this embodiment, it is still essential that the marks have at least three zones since the marks must be readily distinguishable from magnetic noise in the rail.

The following non-limiting example of this embodiment assumes that marks having the same code are used to control automatic tampers in a four tamper gang although, as in the previously described embodiment, this embodiment is obviously not limited either to use with tampers or with four machines. The detector circuit of the first tamper in the gang is programmed to tamp the tie at every fourth mark and will erase the mark at this tie. The detector circuit of the next tamper is programmed to tamp the tie at every third mark and will erase the mark at this tie, and the detector circuit of the third tamper is programmed to tamp the tie at each second mark and will erase the mark at this tie. The detector circuit of the last tamper in the gang is arranged so that the tie at each mark is tamped, and this will be every fourth tie in normal operation. The marks which actuate the final tamper need not be erased, but it may be desirable to erase these marks from rails which carry train control signals so that they do not interfere with the signal carrying function of a rail. An advantage of this embodiment is that the last tamper in the gang tamps any ties which have been missed for one reason or another by one of the preceding tampers since it tamps at each mark. Additionally, if a tamper gets out of phase for one reason or another, the following tampers will develop a sequence matching the sequence of the tamper which is out of phase and all ties will be tamped.

Figure 7:
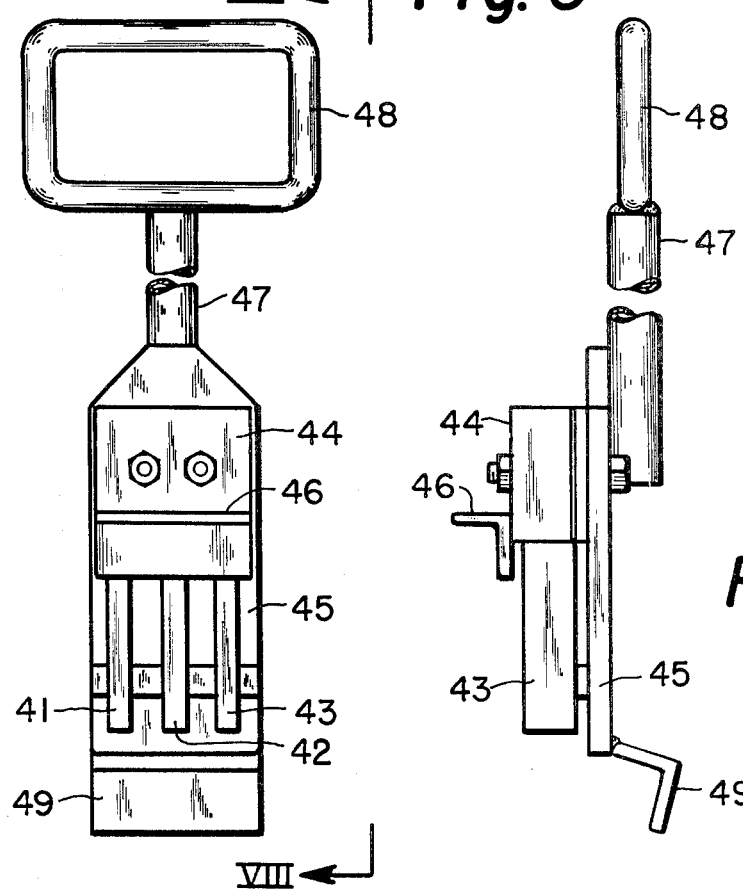
FIG. 7 is an elevation of a manual encoder which may be used in carrying out our invention in accordance with another embodiment thereof.
Figure 8:
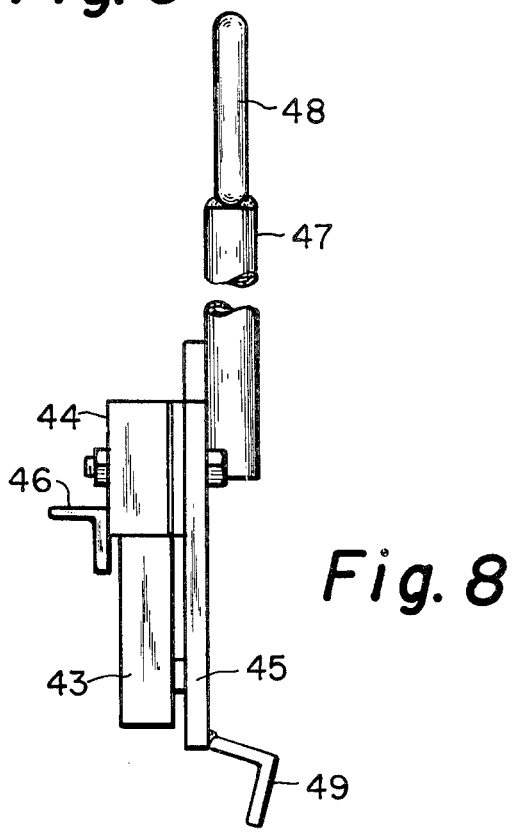
FIG. 8 is a view of the encoder taken on line VIII—VIII of FIG. 7.

A manual encoder which may be used with this embodiment is shown in FIGS. 7 and 8 of the drawings. This encoder includes three permanent magnets 41, 42 and 43 of alternate polarity supported by a spacer head 44 which is bolted to a plate 45. A slide 46 is attached to the side of the spacer head opposite plate 45 and a stop 49 is formed at the lower edge of the plate. The plate 45 is attached to a shaft 47 having a handle 48 at its upper end. A rail is marked with the manual encoder by the operator pulling the magnets across the railhead toward himself while walking on the outside of the rail. When the stop 49 contacts the inside of the railhead, the operator places the slide 46 back on the railhead and continues to the next tie where the magnets are placed on the railhead and the operation is repeated.

An automatic encoder and circuit which may be used with this embodiment is a simplified version of the arrangement shown in FIG. 4. A single encoder is used comprising a three-tine magnet like that shown in FIG. 4 and only one coil is wound on the central tine since it is unnecessary to reverse the polarity of the zones. The marking circuit includes a pair of limit switches actuated by contact arms and a pick-up head to prevent marking previously tamped ties.

The pick-up head and detector circuit shown in FIG. 9 for use in this embodiment are basically the same as those shown in FIG. 5 except that the circuit includes a stepping switch and an alternating current erase head, and the same reference numerals are used to refer to the same elements to avoid repetition. The pick-up and erase head P′ and the detector circuit of FIG. 9 are used on the first vehicle of a four vehicle gang operated in accordance with this embodiment. The head P′ includes a pair of soft iron cores 60 and 61 having coils 62 and 63 wound thereon and connected with amplifiers A1 and A2. Amplifiers A1 and A2 are connected with relays AR1 and AR2 having contacts for controlling the passage of current to a stepping switch coil. The head includes an electromagnetic eraser comprising a soft iron core 100 and a coil 101 connected in series with relay contact SR–EC which permits alternating current to pass coil 101 when closed to remove the mark from the rail. The pick-up stepping switch SS–P in this embodiment is also a type MER manufactured by Guardian Electric Manufacturing Company, but it is to be understood that other commercially available stepping switches may be used. The stepping switch includes a contact arm 105 rotatable in the direction of the arrow and ten peripheral contacts 106, 107, 108, 109, 110, 111, 112, 113, 114 and 115. Contacts 110 and 115 are connected to stop relay SR, and the other contacts are dead. Stepping coil SSC–P is connected in series with contacts AR1 and AR2 so that a momentary closing of these contacts will energize the coil and index arm 105 in a clockwise direction. Coil SSC–P is also connected in series with relay contact T′ which momentarily closes at the same time as contact T and contact T′ and is connected in parallel with contacts AR1 and AR2 so that closure of contact T′ at the end of a work cycle will permit coil SSC–P to index arm 105 from a live contact to a dead contact even though contacts AR1 and AR2 are open.

The vehicle control circuit shown above the dotted line in FIG. 9 is identical with that shown in FIG. 5 and includes contact T, travel relay TRR, brake solenoid B and tool relay TOR.

The operation of a vehicle equipped with working tools and provided with the circuit of FIG. 9 is as follows assuming contact arm 105 to be on live contact 115, as shown. When the work cycle is completed and the tools deactuated, a pulse is sent to forward relay FR by momentary closure of relay contact T to energize relay FR and close contact FR thereby deactuating the vehicle brakes and actuating the travel motor. Simultaneously with closure of contact T, contact T′ closes and permits a momentary pulse to pass to coil SSC–P, and arm 115 is indexed to dead contact 106. At the next mark on the rail, amplifiers A1 and A2 receive signals from the pick-up magnets and relays AR1 and AR2 are energized to close contacts AR1 and AR2 and to permit current to pass momentarily to coil SSC–P of the stepping switch to index arm 105 in a clockwise direction to contact 107. Since contact 107 is a dead contact, no current is conducted to relay SR and the vehicle proceeds along the track. At the next two marks on the track, the above sequence is repeated with arm 105 moving successively to peripheral contacts 108 and 109. When the pick-up magnets sense the fourth consecutive mark, arm 105 rotates onto live contact 110, and relay SR is energized opening contact SR in the vehicle control circuit and actuating the vehicle brakes and deactuating the travel motor to stop the vehicle at the work station indicated by this mark. Simultaneous with opening contact SR, relay SR closes contact SR–EC to permit current to pass to coil 101 on core 100; and as the vehicle decelerates to a stop, the erase magnet removes the mark from the rail so that it will not be considered by the pick-up heads on the following vehicles. The contact SR–EC is opened upon de-energization of the stop relay SR. Upon completion of the work cycle, contact T closes to energize relay FR and contact T′ closes to energize coil SSC–P which indexes arm 105 to dead contact 111. The vehicle then travels along the track with arm 105 advancing step by step as signals are received until arm 105 contacts live contact 115 at which time the cycle is repeated.

The subsequent vehicles in the gang operate in the same manner as described above except that the second vehicle has a stepper switch which stops it at every third mark, and the third vehicle has a stepper switch which stops it at every second mark. The fourth and last vehicle need not include a stepper switch since it stops at every mark, but the stop relay in the circuit for this vehicle is considered to fall withint he term counting means as used herein since it is energized upon the sensing of one mark. It should be understood that any number of vehicles may be controlled in accordance with this embodiment of our invention by using a properly programmed stepper switch. Additionally, it is not always necessary to erase the marks from the rail.

Although our invention has been described with the coded marks located in the upper surface of the railhead, it should be understood that they may be placed in the inner and outer edge of the railhead with equal facility; and, in fact, at times it is desirable to place the marks in an edge of the railhead since the marks are not as easily removed by the passage of train wheels when they are located in the edges of the railhead. For example, the marks may be placed in an edge of the railhead if the rail is marked considerably ahead of the time when it is anticipated that the operation which is to be carried out at the mark is to be performed.

As pointed out heretofore, our invention is not limited to use in a tamping operation but may also be used in connection with other types of track maintenance operations such as, for example, tie replacement and spiking. Our invention also has practical usage for general rail vehicle control. The encoding vehicle and encoder or encoders may be controlled by a previously prepared type or series of punch cards rather than by sensing means carried on the vehicle if desired. Additionally, it is possible to control the encoding operation by means of a centrally located computer which is supplied with track information. Regardless of the manner of controlling the encoding operation, our invention provides a method of automatic vehicle control of great accuracy and flexibility.

Our invention provides automatic vehicle control which may be utilized without an operator and which makes use of the available rails to store information. The marks in the rail are not subject to removal such as are paint and chalk marks placed on the ties.

While we have shown and described preferred embodiments of our invention, it may be otherwise embodied within the scope of the appended claims.

We claim:

1. A control system for controlling the performance of a plurality of maintenance vehicles having automatic tools for carrying out work cycles traveling in tandem along rails supported on cross ties, said system including a plurality of maintenance vehicles, a marking vehicle traveling along said rails ahead of said maintenance vehicles, said marking vehicle having detecting means for accurately locating cross ties and electric encoding means responsive to said detecting means located over at least one of said rails for impressing a coded magnetic mark directly in at least one of said rails to indicate the location of each cross tie located by said detecting means, pick-up means on each of said maintenance vehicles for detecting magnetic marks and control means on each of said maintenance vehicles for controlling vehicle movement and the operation of the vehicle tools, said pick-up means on each maintenance vehicle comprising a pick-up head located over at least one of said rails for sensing magnetic marks in said rail and circuit means connecting said pick-up head and said control means responsive to a signal generated by said pick-up head when said head senses a magnetic mark, whereby said control means stops the movement of the vehicle upon which it is mounted and actuates the vehicle tools to initiate the tool work cycle when activated by said circuit means in response to a signal supplied to said circuit means by said pick-up head.

2. A control system as set forth in claim 1 wherein said circuit means includes counting means for counting the number of signals generated by said pick-up head when said head senses a magnetic mark and erase means behind said pick-up head and operatively connected with said circuit means for removing magnetic marks from said rail, whereby said circuit means only actuates said control means in response to signals having a predetermined relationship to the number of signals counted.

3. A control system as set forth in claim 1 wherein sad marking vehicle includes a pick-up head for sensing magnetic marks in said rail, a control circuit operatively connecting said pick-up head with said encoding means, said control circuit including means for deactivating said encoding means when said pick-up head generates a signal in response to a mark in said rail.

4. A control system as set forth in claim 1 wherein said electric encoding means includes limit switches and an electromagnet, said limit switches being connected between said electromagnet and a current supply and being closed when said detecting means contacts a tie, whereby said limit switches are closed to actuate said electromagnet when a cross tie is located by said detecting means and current is passed to said electromagnet to impress a mark in said rail.

5. A control system as set forth in claim 4 wherein said marking vehicle includes a vibrating ballast sweeper aligned with said detecting means and mounted on the vehicle ahead of said detecting means to pass over said cross ties ahead of said detecting means, whereby a path is cleared through loose ballast for said detecting means.

6. Apparatus for marking a rail of railroad track including a vehicle having a frame, a magnetic encoder depending from said frame above a rail, means on said vehicle for locating ties and an electric circuit including switch means actuated by said tie locating means and operatively connecting said switch means and said encoder, whereby actuation of said switch means by said tie locating means actuates said encoder to place a coded mark upon a rail.

7. Apparatus as set forth in claim 6 including a second magnetic encoder depending from said frame above the other rail of said track and operatively connected in said electric circuit and said circuit including means for independently actuating said first and second encoders.

8. Apparatus as set forth in claim 6 wherein said vehicle includes means depending from said frame in alignment with and forward of said tie locating means to clear a path through ballast on the upper surfaces of said ties.

9. Apparatus as set forth in claim 8 wherein said means for clearing ballast comprise an arm depending from the forward end of said frame, sweeper means on the lower end of said arm and means for vibrating said arm.

10. Apparatus as set forth in claim 6 including a pick-up head depending from said frame above one rail and positioned forwardly of said encoder for sensing magnetic marks located on said one rail, said pick-up head being operatively connected with said electric circuit and relay means in said circuit responsive to a signal generated by said pick-up head to prevent operation of said encoder even though said switch means are actuated by said tie locating means.

11. Apparatus as set forth in claim 6 wherein said encoder is a soft iron core having three tines and said circuit means includes a pair of oppositely wound coils around the center tine of said core to form a reversible electromagnet and wherein said circuit means includes means for independently supplying current to said coils so that the polarity of said tines may be reversed to change the polarity of the mark placed on a rail by said encoder.

12. A vehicle for traveling along railroad track having a drive motor, brake means, tool means and control means for said drive motor, brake means and tool means, a pick-up head mounted above at least one rail of the railroad track for detecting marks on said rail, and circuit means operatively connecting said control means with said pick-up head, said circuit means including counting means responsive to signals generated by said pick-up means, said counting means actuating said drive motor, brake means and tool means in response to a predetermined number of signals generated by said pick-up head.

13. Apparatus as set forth in claim 12 including an alternating current magnet immediately behind said pick-up head, whereby a magnetic mark can be erased from said rail after said pick-up head has sensed said mark.

References Cited

UNITED STATES PATENTS 1,374,954    4/1921    Ruthven _____ 246—202
2,396,409    3/1946    Berzer _____ 179—100.2

DRAYTON E. HOFFMAN, Primary Examiner

G. H. LIBMAN, Assistant Examiner

U.S. Cl. X.R.

104—1